US012142172B2

(12) United States Patent
Wang et al.

(10) Patent No.: US 12,142,172 B2
(45) Date of Patent: Nov. 12, 2024

(54) DRIVING METHOD FOR DISPLAY PANEL, AND DISPLAY APPARATUS

(71) Applicants: Beijing BOE Optoelectronics Technology Co., Ltd., Beijing (CN); BOE Technology Group Co., Ltd., Beijing (CN)

(72) Inventors: Qiang Wang, Beijing (CN); Zhengxin Zhang, Beijing (CN); Lei Guo, Beijing (CN); Jiali Zhang, Beijing (CN); Ye Wang, Beijing (CN); Junrui Cui, Beijing (CN); Wei Tang, Beijing (CN); Pengju Zhang, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/016,437

(22) PCT Filed: Feb. 18, 2022

(86) PCT No.: PCT/CN2022/076854
§ 371 (c)(1),
(2) Date: Jan. 16, 2023

(87) PCT Pub. No.: WO2023/155137
PCT Pub. Date: Aug. 24, 2023

(65) Prior Publication Data
US 2024/0257678 A1 Aug. 1, 2024

(51) Int. Cl.
*G09G 3/00* (2006.01)
*G09G 3/36* (2006.01)

(52) U.S. Cl.
CPC .......... *G09G 3/006* (2013.01); *G09G 3/3677* (2013.01); *G09G 3/3614* (2013.01);
(Continued)

(58) Field of Classification Search
None
See application file for complete search history.

(56) References Cited

U.S. PATENT DOCUMENTS

2013/0135282 A1* 5/2013 Jeon .................... G09G 3/3696 345/212
2022/0383822 A1 12/2022 Shang et al.

FOREIGN PATENT DOCUMENTS

| | | | |
|---|---|---|---|
| CN | 109272931 | A | 1/2019 |
| CN | 108564907 | B | 1/2021 |
| WO | 2021223565 | A1 | 11/2021 |

* cited by examiner

*Primary Examiner* — Christopher J Kohlman
(74) *Attorney, Agent, or Firm* — IPro, PLLC

(57) ABSTRACT

Provided in embodiments of the disclosure are a driving method for a display panel, and a display apparatus. A display frame includes a data refresh phase and a blanking time phase. The driving method for the display panel includes: in the data refresh phase, loading a clock signal including an active level and an inactive level to a gate driving circuit in a display panel to cause a gate line to load a gate-on signal, loading display data to a source driving circuit in the display panel to cause a data line to load a data voltage, and determining a current operating state of the display panel; and in the blanking time phase, loading a clock signal including an inactive level to the gate driving circuit in the display panel to cause the gate line to load a gate-off signal, and sending the current operating state of the display panel.

16 Claims, 10 Drawing Sheets

(52) U.S. Cl.
CPC . *G09G 2310/0286* (2013.01); *G09G 2310/08* (2013.01); *G09G 2330/04* (2013.01); *G09G 2370/00* (2013.01)

DRIVING METHOD FOR DISPLAY PANEL, AND DISPLAY APPARATUS

CROSS-REFERENCE TO RELATED APPLICATIONS

The disclosure is a National Stage of International Application No. PCT/CN2022/076854, filed on Feb. 18, 2022, which is hereby incorporated by reference in their entireties.

FIELD

The present disclosure relates to the technical field of display, in particular to a driving method for a display panel, and a display apparatus.

BACKGROUND

A display such as a liquid crystal display (LCD) and an organic light-emitting diode (OLED) generally includes a plurality of pixel units. Each pixel unit may include a red sub-pixel, a green sub-pixel and a blue sub-pixel. By means of controlling brightness corresponding to each sub-pixel, colors required to be displayed are mixed to display a color image.

SUMMARY

An embodiment of the present disclosure provides a driving method for a display panel. A display frame includes a data refresh period and a blanking time period. The driving method for the display panel includes:

in the data refresh period, loading a clock signal including an active level and an inactive level to a gate driving circuit in the display panel to cause a gate line to load a gate-on signal, loading display data to a source driving circuit in the display panel to cause a data line to load a data voltage, and determining a current operating state of the display panel; and in the blanking time period, loading a clock signal including an inactive level to the gate driving circuit in the display panel to cause the gate line to load a gate-off signal, and sending the current operating state of the display panel.

In some embodiments, the determining the current operating state of the display panel includes:

collecting a protection signal outputted by a protection circuit disposed in the display panel;

determining the current operating state of the display panel to be an abnormal operating state in a case that the protection signal is not less than a signal threshold; and determining the current operating state of the display panel to be a normal operating state in a case that the protection signal is less than the signal threshold.

In some embodiments, the driving method further includes:

generating and storing an abnormal operating instruction while determining the current operating state of the display panel to be the abnormal operating state; and generating and storing a normal operating instruction while determining the current operating state of the display panel to be the normal operating state;

where the sending the current operating state of the display panel includes;

sending the stored abnormal operating instruction in a case that the current operating state of the display panel is determined to be the abnormal operating state; and sending the stored normal operating instruction in a case that the current operating state of the display panel is determined to be the normal operating state.

In some embodiments, the driving method further includes:

in the data refresh period, receiving a static electricity detection instruction, and determining the current operating state of the display panel on the basis of the static electricity detection instruction.

In some embodiments, the driving method further includes:

in the blanking time period, receiving a state request instruction, and sending the current operating state of the display panel based on the state request instruction.

In some embodiments, the blanking time period is entered after the active level of the clock signal corresponding to the gate-on signal loaded by a last gate line in the display panel ends.

In some embodiments, after the blanking time period is entered and set time passes, the state request instruction is received.

In some embodiments, the driving method further includes: in each of a plurality of continuous display frames, determining the current operating state of the display panel in the data refresh period, and determining the current operating state of the display panel to be sent in the blanking time period.

In some embodiments, the driving method further includes: in display frames of at least every other display frame in a plurality of continuous display frames, determining the current operating state of the display panel in the data refresh period, and, determining the current operating state of the display panel to be sent in the blanking time period.

An embodiment of the present disclosure provides a display apparatus. The display apparatus includes:

a display panel, including a gate driving circuit and a source driving circuit; and a display driving circuit, configured to, in a data refresh period, load a clock signal including an active level and an inactive level to the gate driving circuit in the display panel to cause a gate line to load a gate-on signal, load display data to the source driving circuit in the display panel to cause a data line to load a data voltage, and determine the current operating state of the display panel: and in a blanking time period, load a clock signal including an inactive level to the gate driving circuit in the display panel to cause the gate line to load a gate-off signal, and send the current operating state of the display panel: where a display frame includes the data refresh period and the blanking time period.

In some embodiments, the display apparatus further includes a main control unit. The main control unit is configured to send a state request instruction in the blanking time period; and the display driving circuit is further configured to, in the blanking time period, receive the state request instruction, and send the current operating state of the display panel to the main control unit based on the state request instruction.

In some embodiments, the display driving circuit includes a state register: and the state register is configured to store an abnormal operating instruction and a normal operating instruction.

In some embodiments, the main control unit is further configured to send a static electricity detection instruction in the data refresh period: and the display driving circuit is further configured to, in the data refresh period, receive the static electricity detection instruction, and determine the current operating state of the display panel based on the static electricity detection instruction.

In some embodiments, the display apparatus further includes a signal transmission board, and the signal transmission board includes a plurality of signal transmission lines: the display driving circuit is coupled to the display panel through the signal transmission board; and the signal transmission board is configured to transmit the clock signal sent by the display driving circuit to the display panel.

In some embodiments, the signal transmission board includes a flexible printed circuit board.

In some embodiments, the number of the display driving circuit is one.

DETAILED DESCRIPTION OF THE EMBODIMENTS

Figure 1:
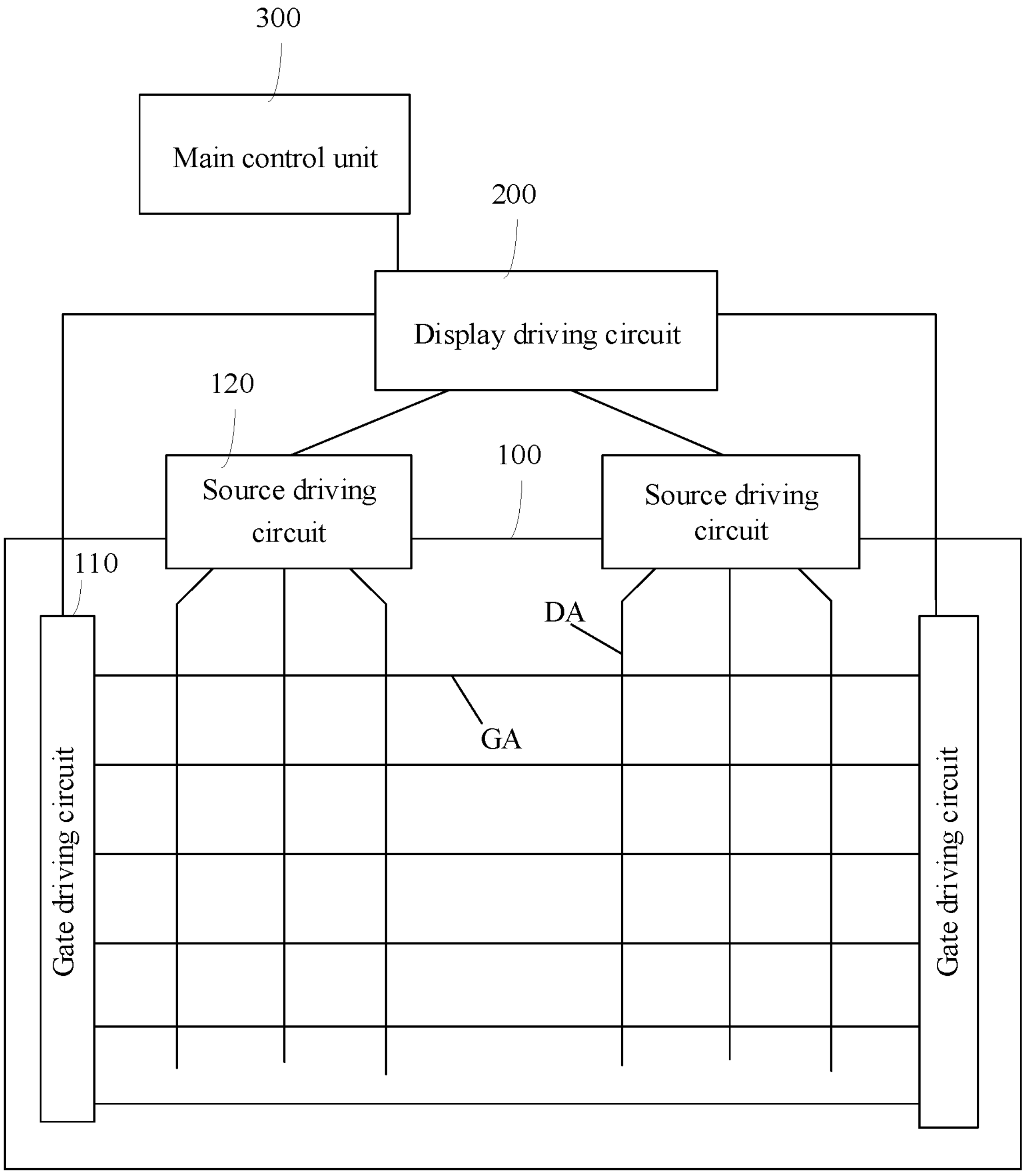
FIG. 1 is a schematic diagram of a structure of some display apparatuses according to embodiments of the present disclosure.

In order to make the purposes, technical solutions and advantages of the embodiments of the present disclosure clearer, the technical solutions in the embodiments of the present disclosure will be clearly and completely described below with reference to the drawings in the embodiments of the present disclosure. It is apparent that the embodiments described herein are a part of the embodiments of the present disclosure, instead of all of the embodiments. The embodiments in the present disclosure and the features in the embodiments may be combined with one another without conflict. On the basis of the described embodiments in the present disclosure, all other embodiments obtained by those of ordinary skilled in the art without creative work shall fall within the protection scope of the present disclosure.

Unless otherwise defined, technical terms or scientific terms used in the present disclosure shall have the ordinary meaning as understood by persons with ordinary skill in the art to which the present disclosure belongs. As used in the disclosure, “first,” “second,” and similar words do not denote any order, quantity, or importance, but are merely used to distinguish different components. Similar words such as “comprise” or “include” are intended to mean that an element or object appearing before the word covers the element or object appearing after the word listed and equivalents thereof, without excluding other elements or objects. Similar terms such as “connection” or “link” are not limited to physical or mechanical connection, but may include electrical connection, whether direct or indirect.

It is to be noted that the size and shape of each figure in the drawings do not reflect true scale and are intended to illustrate the present disclosure only schematically. In addition, the same or similar reference numerals throughout the present disclosure represent the same or similar elements or the elements having the same or similar functions.

Figure 2:
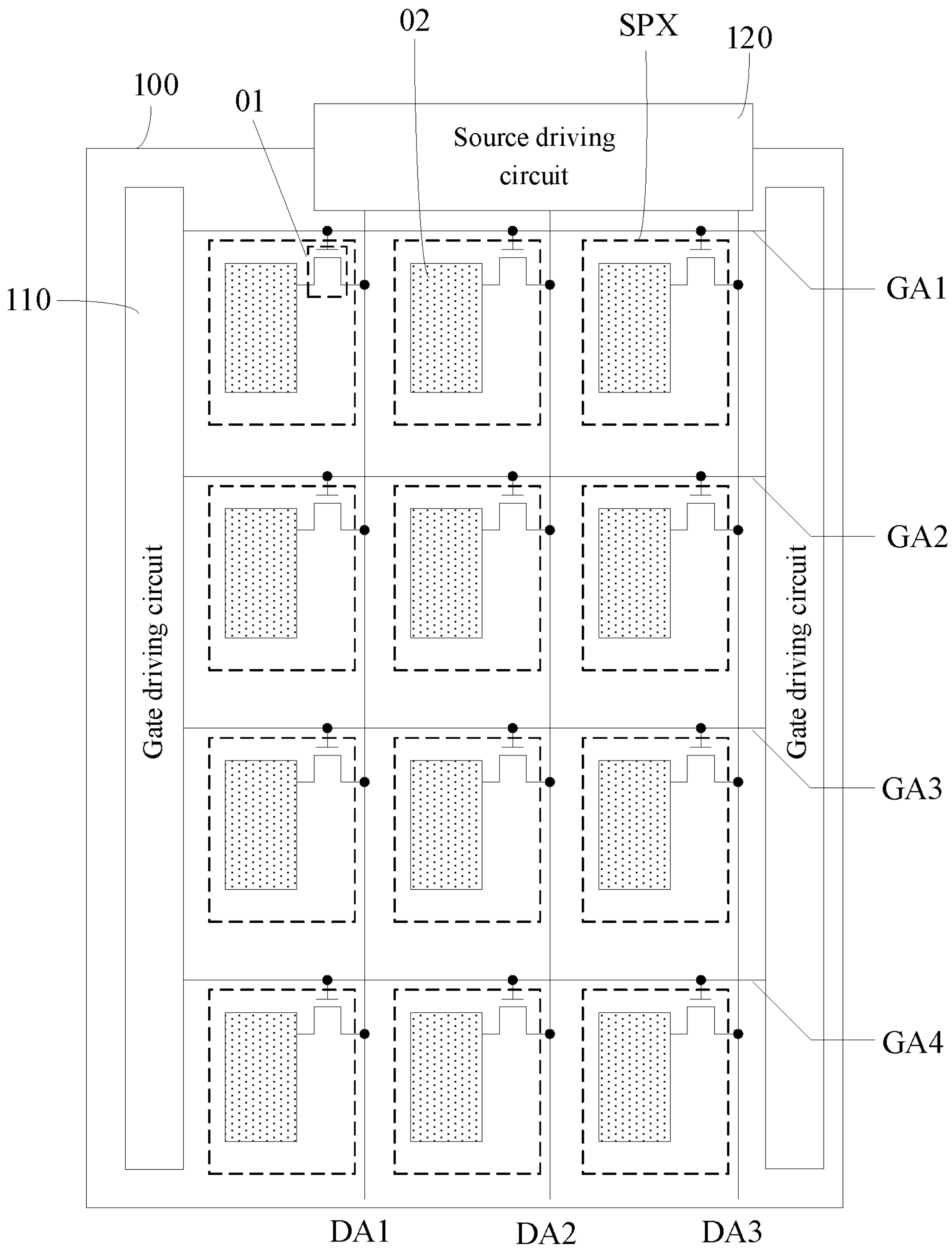
FIG. 2 is a schematic diagram of a structure of some display panels according to embodiments of the present disclosure.

Referring to FIG. 1 and FIG. 2, a display apparatus includes a display panel 100, a display driving circuit 200 and a main control unit 300. The display panel 100 includes a plurality of pixel units which are arranged in array, and a plurality of gate lines GA (for example, GA1, GA2, GA3 and GA4), a plurality of data lines DA (DA1, DA2 and DA3), a gate driving circuit 110 and a source driving circuit 120. The gate driving circuit 110 is coupled to the gate lines GA1, GA2, GA3 and GA4 separately: and the source driving circuit 120 is coupled to the data lines DA1, DA2 and DA3 separately. The main control unit 300 receives display data (the display data includes digital voltage forms, which are in one-to-one correspondence with sub-pixels, of data voltages carrying corresponding grayscale values), and sends the display data to the display driving circuit 200. After receiving the display data, the display driving circuit 200 correspondingly processes the display data. In addition, the display driving circuit 200 may input a clock signal and a frame start signal to the gate driving circuit 110, so that the gate driving circuit 110 outputs a gate driving signal, so as to drive the gate lines GA1, GA2, GA3 and GA4. The display driving circuit 200 inputs the processed display data into the source driving circuit 120, to make the source driving circuit 120 input the data voltages to the data lines according to the received display data, so as to charge sub-pixels SPX, such that the corresponding data voltages are inputted to the sub-pixels SPX to achieve a picture display function. Exemplarily, two source driving circuits 120 may be disposed, where one source driving circuit 120 is connected to half of the data lines, and the other source driving circuit 120 is connected to the other half of the data lines. Definitely, the number of the source driving circuits 120 may also set to be 3, 4 or more, which may be designed and determined according to actual application requirements, and is not limited herein. FIG. 2 only illustrates a manner in which two gate driving circuits are disposed and bilateral driving is employed. Definitely, the gate driving circuit or two gate driving circuits may be disposed only on one side of the gate lines, where one gate driving circuit drives the gate lines connected to the sub-pixels in odd rows, and the other gate driving circuit drives the gate lines connected to the sub-pixels in even rows.

Exemplarily, each pixel unit includes a plurality of sub-pixels SPX. For example, the pixel unit may include a red sub-pixel, a green sub-pixel and a blue sub-pixel. In this way, color mixing may be performed via red, green and blue, to achieve color display. Alternatively, the pixel unit may also include a red sub-pixel, a green sub-pixel, a blue sub-pixel and a white sub-pixel. In this way, color mixing may be performed via red, green, blue and white, to achieve color display. Definitely, in actual application, the light-emitting colors of the sub-pixels in the pixel unit may be designed and determined according to an actual application environment, which are not limited herein.

Referring to FIG. 2, each sub-pixel SPX includes a transistor 01 and a pixel electrode 02. One row of sub-pixels SPX corresponds to one gate line, and one column of sub-pixels SPX corresponds to one data line. A gate of the transistor 01 is electrically connected to the corresponding gate line, a source of the transistor 01 is electrically connected to the corresponding data line, and a drain of the transistor 01 is electrically connected to the pixel electrode 02. It is to be noted that, a pixel array structure in the present disclosure may also be a double-gate structure, that is, two gate lines are arranged between the two adjacent rows of pixels: and such an arrangement manner may reduce half of the data lines. That is, some have the data line between the two adjacent columns of pixels, and some do not have the data line between the two adjacent columns of pixels. The specific pixel arrangement structure, and the arrangement manner of the data lines and scanning lines are not limited.

It is to be noted that the display panel in the embodiments of the present disclosure may be a liquid crystal display panel. Exemplarily, the liquid crystal display panel generally includes an upper substrate and a lower substrate of box alignment, and liquid crystal molecules which are encapsulated between the upper substrate and the lower substrate. When a picture is displayed, since there is a voltage difference between the data voltage loaded on the pixel electrode of each sub-pixel SPX and a common electrode voltage on a common electrode, and the voltage difference may form an electric field, so as to make the liquid crystal molecules deflected under the action of the electric field. Since the degree of deflection of the liquid crystal molecules varies with the electric field with different strengths, the transmittance of the sub-pixels SPX is different, such that the sub-pixels SPX achieve brightness with different gray-scales, so as to display the picture. Definitely, the display panel in the embodiments of the present disclosure may be an OLED display panel, which is not limited herein.

Figure 3:
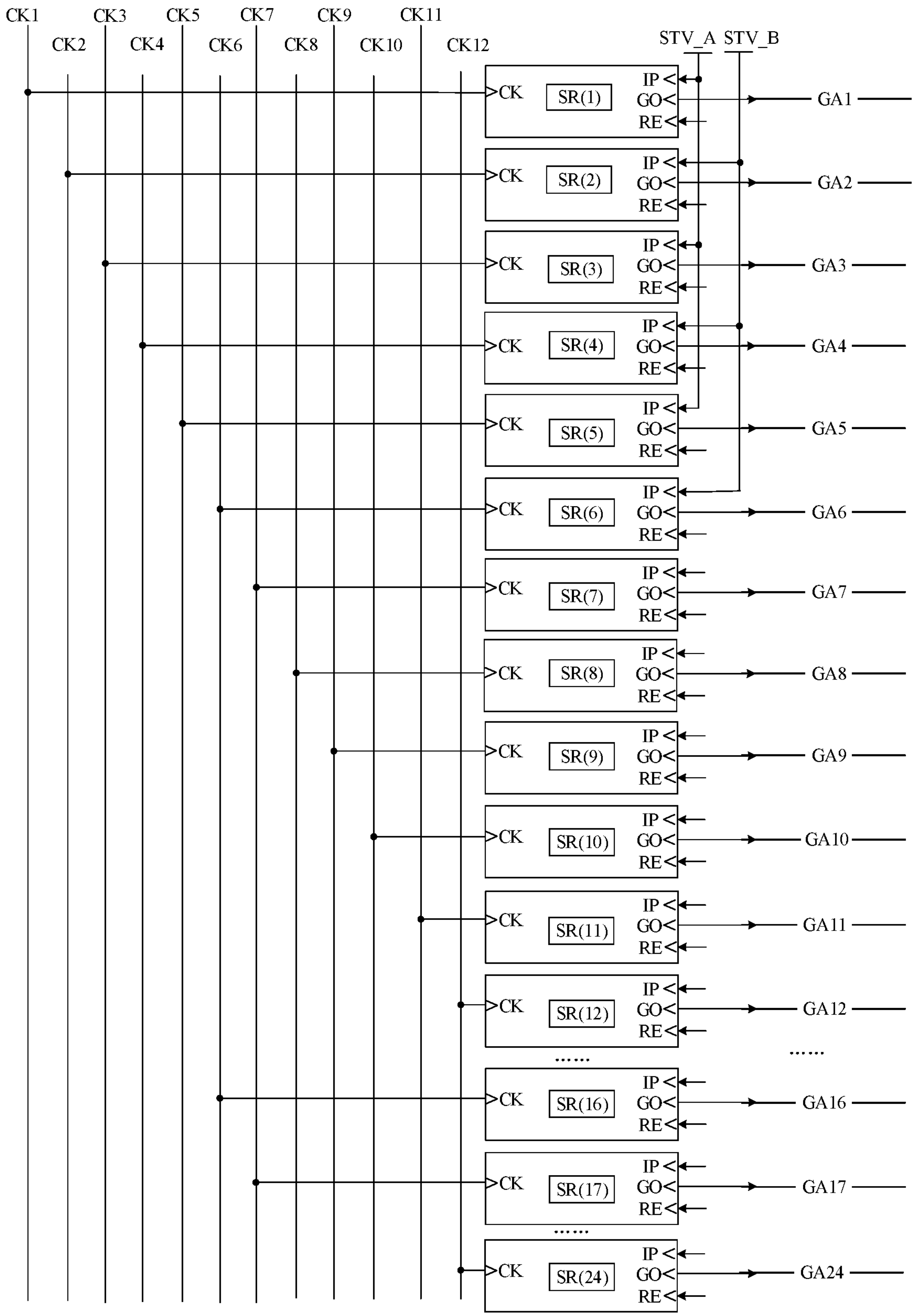
FIG. 3 is a schematic diagram of a structure of some gate driving circuits according to embodiments of the present disclosure.

In some examples, the gate driving circuit may include a plurality of shift registers. For example, as shown in FIG. 3. 1st-stage to Nth-stage shift registers: SR(1). SR(2) . . . SR(n−1). SR(n) . . . SR(N−1). SR(N) (N shift registers in total. 1≤n≤N, where n is an integer, and SR(1)-SR(24) are taken as examples in FIG. 2). A plurality of shift registers in the gate driving circuit are divided into a plurality of register groups. The shift registers in the same register group may be arranged in cascade: and frame start signal ends connected to different register groups are different.

Figure 4A:
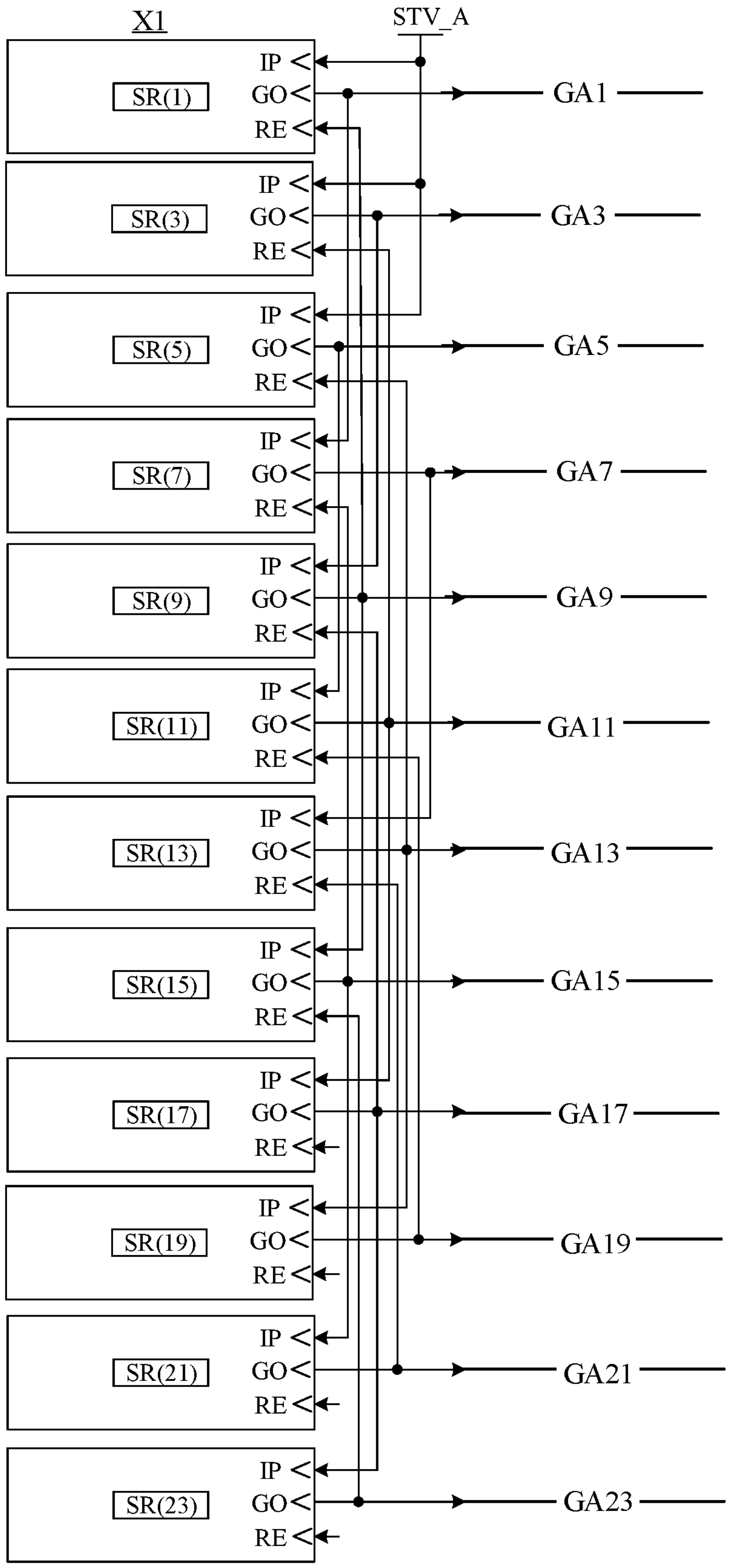
FIG. 4A is a schematic diagram of a structure of some other gate driving circuits according to embodiments of the present disclosure.

Exemplarily, the shift registers in the gate driving circuit may be divided into two register groups. As shown in FIG. 3 and FIG. 4A, a first register group X1 in the two register groups includes odd-numbered shift registers: 1st-stage shift register SR(1). 3rd-stage shift register SR(3). 5th-stage shift register SR(5), . . . , 19th-stage shift register SR(19). 21th-stage shift register SR(21) and 23th-stage shift register SR(23). In addition, the odd-numbered-stage shift registers are electrically connected to the odd-numbered gate lines. An input signal end IP of the 1st-stage shift register SR(1), an input signal end IP of the 3rd-stage shift register SR(3) and an input signal end IP of the 5th-stage shift register SR(5) are all electrically connected to the frame start signal end STV_A. An output signal end GO of the 1st-stage shift register SR(1) is electrically connected to an input signal end IP of the 7th-stage shift register SR(7): an output signal end GO of the 3rd-stage shift register SR(3) is electrically connected to an input signal end IP of the 9th-stage shift register SR(9); . . . an output signal end GO of the 15th-stage shift register SR(15) is electrically connected to an input signal end IP of the 21th-stage shift register SR(21); and an output signal end GO of the 17th-stage shift register SR(17) is electrically connected to an input signal end IP of the 23th-stage shift register SR(23). An output signal end GO of the 9th-stage shift register SR(9) is electrically connected to a reset signal end RE of the 1st-stage shift register SR(1); an output signal end GO of the 11th-stage shift register SR(11) is electrically connected to a reset signal end RE of the 3rd-stage shift register SR(3); . . . an output signal end GO of the 21th-stage shift register SR(21) is electrically connected to a reset signal end RE of the 13th-stage shift register SR(13): and an output signal end GO of the 23th-stage shift register SR(23) is electrically connected to a reset signal end RE of the 15th-stage shift register SR(15).

Figure 4B:
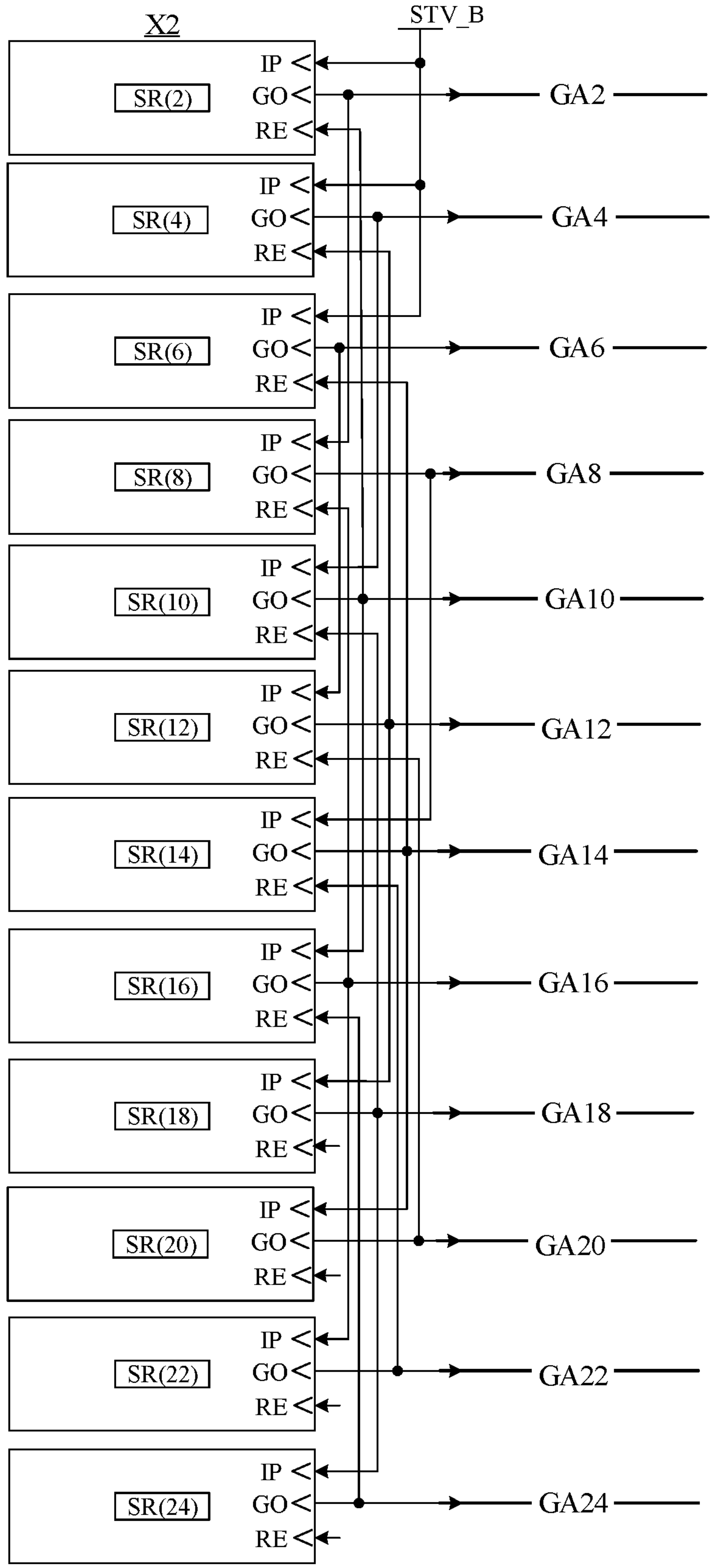
FIG. 4B is a schematic diagram of a structure of some other gate driving circuits according to embodiments of the present disclosure.

As shown in FIG. 2 and FIG. 4B, a second register group X2 in the two register groups includes even-numbered shift registers: 2nd-stage shift register SR(2). 4th-stage shift register SR(4). 6th-stage shift register SR(6), . . . , 20th-stage shift register SR(20). 22th-stage shift register SR(22) and 24th-stage shift register SR(24). In addition, the even-numbered-stage shift registers are electrically connected to the even-numbered gate lines. An input signal end IP of the 2nd-stage shift register SR(2), an input signal end IP of the 4th-stage shift register SR(4) and an input signal end IP of the 6th-stage shift register SR(6) are all electrically connected to the frame start signal end STV_B. An output signal end GO of the 2nd-stage shift register SR(2) is electrically connected to an input signal end IP of the 8th-stage shift register SR(8); an output signal end GO of the 4th-stage shift register SR(4) is electrically connected to an input signal end IP of the 10th-stage shift register SR(10); . . . an output signal end GO of the 16th-stage shift register SR(16) is electrically connected to an input signal end IP of the 22th-stage shift register SR(22); and an output signal end GO of the 18th-stage shift register SR(18) is electrically connected to an input signal end IP of the 24th-stage shift register SR(24). An output signal end GO of the 10th-stage shift register SR(10) is electrically connected to a reset signal end RE of the 2nd-stage shift register SR(2); an output signal end GO of the 12th-stage shift register SR(12) is electrically connected to a reset signal end RE of the 4th-stage shift register SR(4); . . . an output signal end GO of the 22th-stage shift register SR(22) is electrically connected to a reset signal end RE of the 14th-stage shift register SR(14); and an output signal end GO of the 24th-stage shift register SR(24) is electrically connected to a reset signal end RE of the 16th-stage shift register SR(16).

Figure 5:
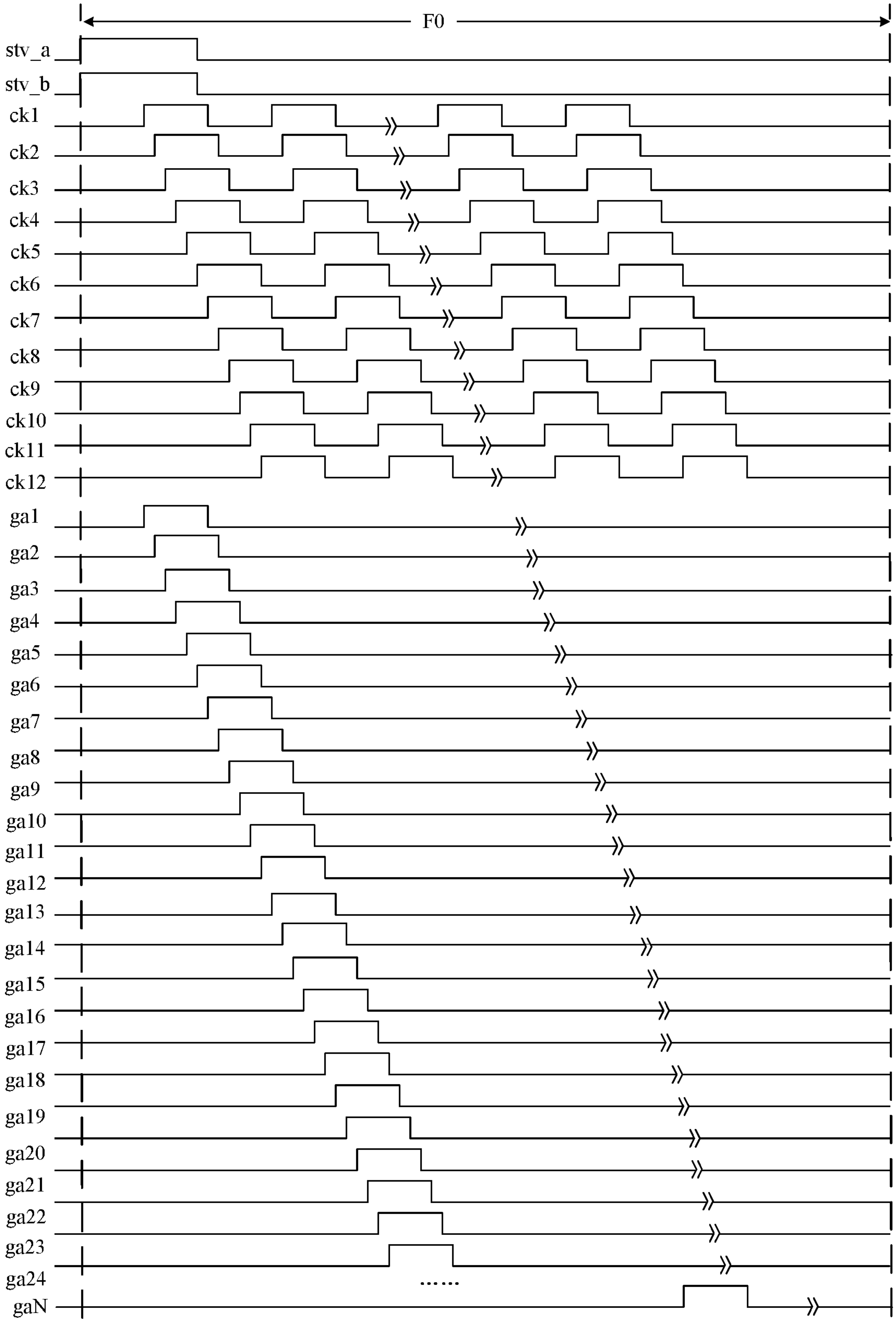
FIG. 5 is a diagram of some signal sequences according to embodiments of the present disclosure.

A sequence diagram of signals corresponding to the gate driving circuit shown in FIG. 3 is as shown in FIG. 5, where stv_a represents a frame start signal of a frame start signal end STV_A; stv_b represents a frame start signal of a frame start signal end STV_B; ck1 represents a clock signal transmitted on a clock signal line CK1; ck2 represents a clock signal transmitted on a clock signal line CK2; ck3 represents a clock signal transmitted on a clock signal line CK3; ck4 represents a clock signal transmitted on a clock signal line CK4; ck5 represents a clock signal transmitted on a clock signal line CK5; ck6 represents a clock signal transmitted on a clock signal line CK6; ck7 represents a clock signal transmitted on a clock signal line CK7; ck8 represents a clock signal transmitted on a clock signal line CK8; ck9 represents a clock signal transmitted on a clock signal line CK9; ck10 represents a clock signal transmitted on a clock signal line CK10; ck11 represents a clock signal transmitted on a clock signal line CK11; and ck12 represents a clock signal transmitted on a clock signal line CK12. A signal ga1 represents a gate driving signal outputted by the output signal end GO of the 1st-stage shift register SR(1); a signal ga2 represents a gate driving signal outputted by the output signal end GO of the 2nd-stage shift register SR(2); a signal ga3 represents a gate driving signal outputted by the output signal end GO of the 3rd-stage shift register SR(3); . . . a signal ga24 represents a gate driving signal outputted by the output signal end GO of the 24th-stage shift register SR(24); . . . a signal gaN represents a gate driving signal outputted by the output signal end GO of the Nth-stage shift register SR(N). The 1st-stage shift register SR(1) outputs a first high level of the clock signal ck1 via the output signal end GO, to generate a high level in the signal ga1; the 2nd-stage shift register SR(2) outputs a first high level of the clock signal ck2 via the output signal end GO, to generate a high level in the signal ga2; the 3rd-stage shift register SR(3) outputs a first high level of the clock signal ck3 via the output signal end GO, to generate a high level in the signal ga3; . . . the 12th-stage shift register SR(12) outputs a first high level of the clock signal ck12 via of the output signal end GO, to generate a high level in the signal ga12. The 13th-stage shift register SR(13) outputs a second high level of the clock signal ck1 via the output signal end GO, to generate a high level in the signal ga13; the 14th-stage shift register SR(14) outputs a second high level of the clock signal ck2 via the output signal end GO, to generate a high level in the signal ga14; . . . the 24th-stage shift register SR(24) outputs a second high level of the clock signal ck12 via the output signal end GO, to generate a high level in the signal ga24; . . . the Nth-stage shift register SR(N) outputs a last high level of the clock signal ck12 via the output signal end GO, to generate a high level in the signal gaN. That is, the high level of the clock signal may be an active level, and a low level is an inactive level. Definitely, when the shift register outputs the low level of the clock signal via the output signal end GO to generate a low-level signal for controlling the conduction of the transistor in the signal, the low level of the clock signal may act as the active level, and the high level acts as the inactive level.

It is to be noted that, in the embodiments of the present disclosure, taking the shift registers in the gate driving circuit which are only divided into two register groups as an example. In the actual application, the shift registers in the gate driving circuit may also be divided into three register groups, four register groups or more register groups, which are not limited herein.

Grayscale, that is, a brightness change between the darkest and the brightest is generally distinguished into several parts, so as to facilitate screen brightness control. For example, a displayed image consists of red, green and blue, where each color may present a different brightness level, and different colors may be formed by combining the red, the green and the blue of different brightness levels. For example, when the number of grayscale bits of the liquid crystal display panel is 6 bits, then the red, the green and the blue respectively have 64 (that is, $2^6$) grayscales, and the 64 grayscale values are respectively 0-63. When the number of grayscale bits of the liquid crystal display panel is 8 bits, then the red, the green and the blue respectively have 256 (that is, $2^8$) grayscales, and the 256 grayscale values are respectively 0)-255. When the number of grayscale bits of the liquid crystal display panel is 10 bits, then the red, the green and the blue respectively have 1024 (that is, $2^{10}$) grayscales, and the 1024 grayscale values are respectively 0-1023. When the number of grayscale bits of the liquid crystal display panel is 12 bits, then the red, the green and the blue respectively have 4096 (that is, 212) grayscales, and the 4096 grayscale values are respectively 0-4095.

Figure 6:
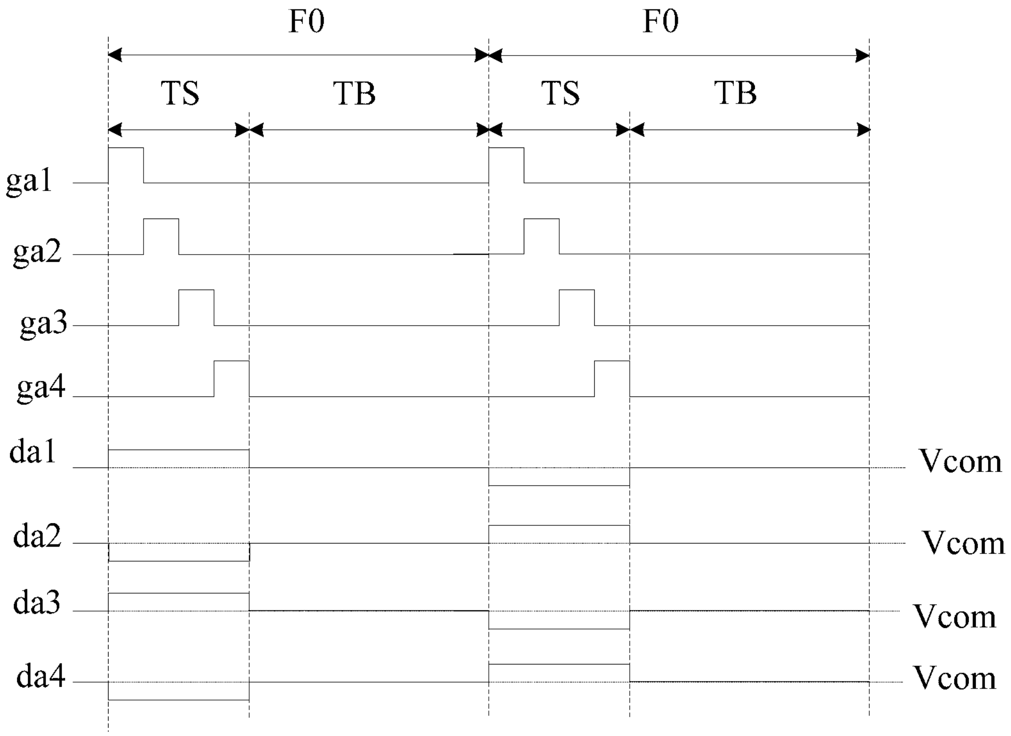
FIG. 6 is a diagram of some other signal sequences according to embodiments of the present disclosure.

As shown in FIG. 6, one sub-pixel SPX is taken as an example, Vcom represents a common electrode voltage. When the data voltage inputted to the pixel electrode of the sub-pixel SPX is greater than the common electrode voltage Vcom, the liquid crystal molecules at the sub-pixel SPX may be positive polarity, and the polarity corresponding to the data voltage in the sub-pixel SPX is positive: and when the data voltage inputted to the pixel electrode of the sub-pixel SPX is less than the common electrode voltage Vcom, the liquid crystal molecules at the sub-pixel SPX may be negative polarity, and the polarity corresponding to the data voltage in the sub-pixel SPX is negative. For example, the common electrode voltage may be 8.3 V, if the data voltage of 8.3 V-16 V is inputted to the pixel electrode of the sub-pixel SPX, the liquid crystal molecules at the sub-pixel SPX may be positive polarity, and the data voltage of 8.3 V-16 V is the data voltage corresponding to positive polarity: and if the data voltage of 0.6 V-8.3 V is inputted to the pixel electrode of the sub-pixel SPX, the liquid crystal molecules at the sub-pixel SPX may be negative polarity, and the data voltage of 0.6 V-8.3 V is the data voltage corresponding to negative polarity. Exemplarily. 8 bits, i.e., 0-255 grayscales are taken as an example, if the data voltage of 16V is inputted to the pixel electrode of the sub-pixel SPX, the sub-pixel SPX may correspond to the brightness of a maximum grayscale value with positive polarity: and if the data voltage of 0.6V is inputted to the pixel electrode of the sub-pixel SPX, the sub-pixel SPX may correspond to the brightness of a maximum grayscale value with negative polarity.

Referring to FIG. 2 to FIG. 6, frame turning (also called point turning, column turning, row turning, and the like) is taken as an example. A display frame FO of the display panel may include a data refresh period TS and a blanking time period TB. In the data refresh period TS, the data voltage may be controlled to be inputted to the sub-pixel in the display panel, to make the display panel to display a picture of the display frame FO. Specifically as shown in FIG. 6, the signal ga1 is loaded to the gate line GA1; the signal ga2 is loaded to the gate line GA2; the signal ga3 is loaded to the gate line GA3; the signal ga4 is loaded to the gate line GA4; and when a gate-on signal (for example a high-level signal in the signals ga1-ga4) appears in the signals ga1-ga4, the corresponding transistors 01 may be controlled to turn on. For example, when the gate-on signal appears in the signal ga1, the transistors 01 in the first row of sub-pixels may be controlled to turn on: and then the source driving circuit 120 loads, according to the display data, the corresponding data voltage da1 to the data line DA1, loads the corresponding data voltage da2 to the data line DA2, and loads the corresponding data voltage da3 to the data line DA3, to input the corresponding data voltages to the pixel electrodes 02 in the first row of sub-pixels, so that the data voltage is inputted to each sub-pixel in the first row: When the gate-on signal appears in the signal ga2, the transistors 01 in the second row of sub-pixels may be controlled to turn on: and then the source driving circuit 120 loads according to the display data, the corresponding data voltage da1 to the data line DA1, loads the corresponding data voltage da2 to the data line DA2, and loads the corresponding data voltage da3 to the data line DA3, to input the corresponding data voltages to the pixel electrodes 02 in the second row of sub-pixels, so that the data voltage is inputted to each sub-pixel in the second row. When the gate-on signal appears in the signal ga3, the transistors 01 in the third row of sub-pixels may be controlled to turn on; and then the source driving circuit 120 loads according to the display data, the corresponding data voltage da1 to the data line DA1, loads the corresponding data voltage da2 to the data line DA2, and loads the corresponding data voltage da3 to the data line DA3, to input the corresponding data voltages to the pixel electrodes 02 in the third row of sub-pixels, so that the data voltage is inputted to each sub-pixel in the third row: When the gate-on signal appears in the signal ga4, the transistors 01 in the fourth row of sub-pixels may be controlled to turn on: and then the source driving circuit 120 loads according to the display data, the corresponding data voltage da1 to the data line DA1, loads the corresponding data voltage da2 to the data line DA2, and loads the corresponding data voltage da3 to the data line DA3, to input the corresponding data voltages to the pixel electrodes 02 in the fourth row of sub-pixels, so that the data voltage is inputted to each sub-pixel in the fourth row: The rest rows are done in the same manner, which are not described in detail herein.

As shown in FIG. 6, in the blanking time period, the signals ga1-ga4 are low levels. The transistor 01 in each sub-pixel is in a cut-off state. The pixel electrode 02 in each sub-pixel is controlled to maintain the data voltage, so as to control the sub-pixels in the display panel to maintain the data voltage, so that the display panel continues to display the picture of the display frame FO.

Figure 7:
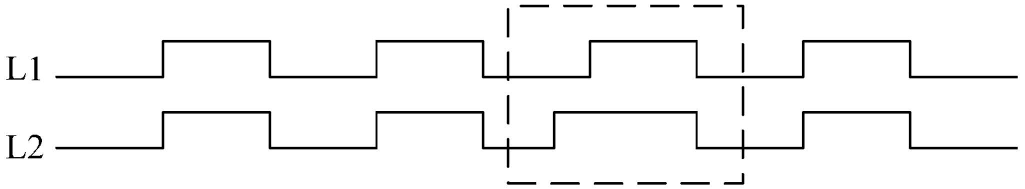
FIG. 7 is a diagram of some other signal sequences according to embodiments of the present disclosure.

When the display panel operates, the display panel may be damaged (for example, blank screen abnormal display, and the like) due to some influences. In order to protect the display panel a display driving circuit may test the display panel, and send a result obtained by testing to the main control unit. When the display driving circuit sends the result obtained by testing to the main control unit, if the display driving circuit sends the clock signal with alternating high and low levels to the gate driving circuit, interference is caused to the clock signal, leading to a wider high level of the clock signal as shown in a dashed box in FIG. 7. In FIG. 7. L1 represents the clock signal without interference; and L2 represents the clock signal with interference.

In the prior art, in order to avoid interference with the clock signal, the clock signal is generally switched to the inactive level when the display driving circuit sends the result obtained by testing to the main control unit. However, through such an arrangement, the gate driving circuit cannot output in cascade, resulting in abnormal display of the display panel. In the driving method provided in the embodiments of the present disclosure, in the data refresh period, the current operating state of the display panel may be determined: and since the clock signal is a dead voltage in the blanking time period, sending the current operating state of the display panel in the blanking time period may avoid interference with the active level of the clock signal when the current operating state of the display panel is sent, the clock signal may not need to be additionally switched to the inactive level, and a signal sequence may not need to be additionally changed, so that the gate driving circuit can normally output in cascade, so as to prevent the display panel from abnormally displaying.

Figure 8:
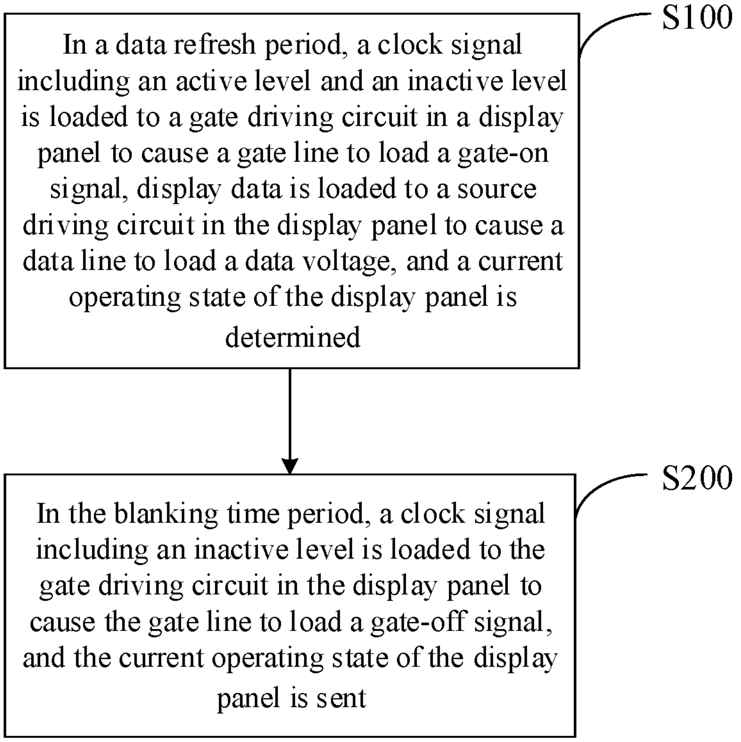
FIG. 8 is a flowchart of a driving method for a display panel according to embodiments of the present disclosure.

As shown in FIG. 8, the driving method for the display panel provided in the embodiments of the present disclosure may include the following steps.

In S100, in a data refresh period a clock signal including an active level and an inactive level is loaded to a gate driving circuit in a display panel to cause a gate line to load a gate-on signal, display data is loaded to a source driving circuit in the display panel to cause a data line to load a data voltage, and a current operating state of the display panel is determined.

In some embodiments of the present disclosure a display driving circuit may load, in the data refresh period, the clock signal including the active level and the inactive level to the gate driving circuit in the display panel to cause the gate line to load the gate-on signal, load the display data to the source driving circuit in the display panel to cause the data line to load the data voltage, and determine the current operating state of the display panel. Exemplarily, the main control unit may send a static electricity detection instruction in the data refresh period. The display driving circuit may receive, in the data refresh period, the static electricity detection instruction, and determine the current operating state of the display panel based on the static electricity detection instruction.

Figure 9:
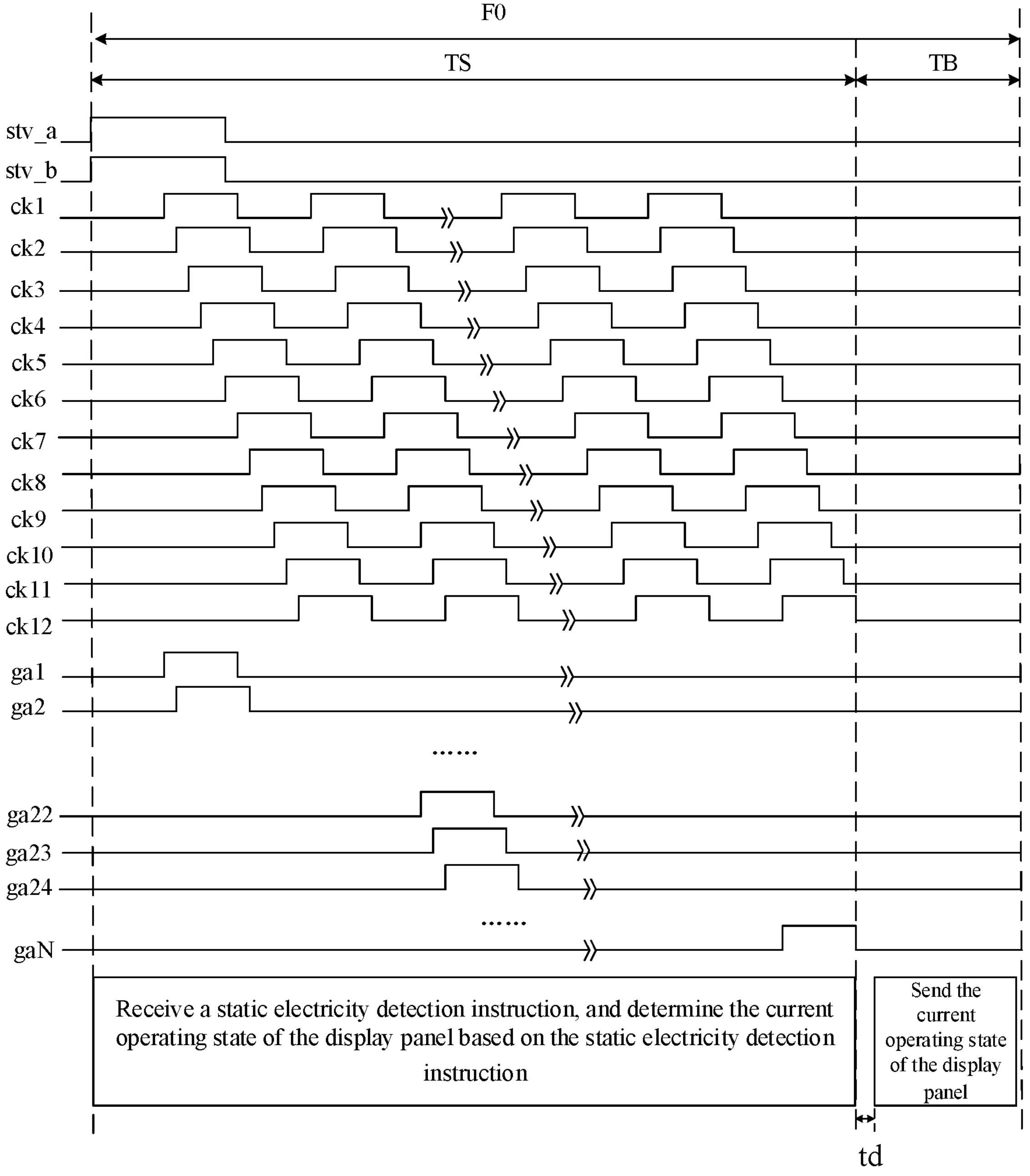
FIG. 9 is a diagram of some other signal sequences according to embodiments of the present disclosure.

In combination with FIG. 9, taking the active levels in the clock signals ck1-ck12 being high levels and the inactive levels being low levels as an example. In the data refresh period TS, the clock signals ck1-ck12 are loaded to the gate driving circuit in the display panel, the signals ga1-gaN may be transmitted on the gate lines GA1-GAN, and the high levels in the signals ga1-ga24 may be used as gate-on signals. The gate-on signals transmitted on the gate lines may control the conduction of the connected transistors. The source driving circuit may input the data voltage to the data line according to the received display data, so as to charge the sub-pixels SPX, so that the corresponding data voltage is inputted to the sub-pixels SPX to achieve a picture display function. In a process of driving the display panel to charge the sub-pixels SPX, the static electricity detection instruction is received, and the current operating state of the display panel is determined based on the static electricity detection instruction. It is to be noted that, the specific process may refer to the description of operating processes of the data refresh period TS and the blanking time period TB, which is not described herein again.

In some embodiments of the present disclosure, the step that the current operating state of the display panel is determined may include: collecting a protection signal outputted by a protection circuit disposed in the display panel: when the protection signal is not less than a signal threshold, the current operating state of the display panel may be determined to be an abnormal operating state; and when the protection signal is less than the signal threshold, the current operating state of the display panel is determined to be a normal operating state. Exemplarily, the abnormal operating state may be, for example a state in which the display panel is greatly affected by static electricity, or a state in which the display panel is subjected to large signal interference. The normal operating state may be a state in which the display panel is less affected by the static electricity or a state in which the display panel is not affected by the static electricity: or the normal operating state may be a state in which the display panel is subjected to small signal interference or a state without signal interference.

Exemplarily, the protection signal may be set as a current. For example, the protection circuit may be an electro static discharge (ESD) circuit; the protection signal may be the current outputted by the ESD circuit; and the signal threshold may be a current threshold. In this way, when the current outputted by the ESD circuit is not less than the current threshold, it indicates that the current is relatively large, so that it may indicate that the display panel is likely to be damaged due to the static electricity, and the current operating state of the display panel is determined to be the abnormal operating state. When the current outputted by the ESD circuit is less than the current threshold, it indicates that the current is relatively small, so that it may indicate that the display panel is less likely to be damaged due to the static electricity, and the current operating state of the display panel is determined to be the normal operating state. Definitely, the protection circuit may also be other functional protection circuits, which is not limited herein.

In some embodiments of the present disclosure, an abnormal operating instruction may be generated and stored while the current operating state of the display panel is determined to be the abnormal operating state; and a normal operating instruction is generated and stored while the current operating state of the display panel is determined to be the normal operating state. Exemplarily, the abnormal operating instruction and the normal operating instruction may be digital signals. For example, the abnormal operating instruction and the normal operating instruction may be the digital signals in binary, decimal or hexadecimal. For example, when the abnormal operating instruction and the normal operating instruction adopt the hexadecimal, the digital signals of 9C may be used to represent the normal operating instruction, and the digital signals (for example, 9D) other than the digital signals of 9C represent the abnormal operating instruction.

In S200, in the blanking time period a clock signal including an inactive level is loaded to the gate driving circuit in the display panel to cause the gate line to load a gate-off signal, and the current operating state of the display panel is sent. Exemplarily as shown in FIG. 9, in the blanking time period TB, clock signals ck1-ck12 including the low levels (that is, inactive levels) are loaded to the gate driving circuit in the display panel, and signals ga1-gaN may all be low levels (that is, gate-off signals).

In some embodiments of the present disclosure, the display driving circuit may load, in the blanking time period, the clock signal including the inactive level to the gate driving circuit in the display panel to cause the gate line to load the gate-off signal, and send the current operating state of the display panel. Exemplarily, the main control unit may send a state request instruction in the blanking time period. The display driving circuit may receive, in the blanking time period, the state request instruction, and send the current operating state of the display panel to the main control unit based on the state request instruction. Optionally, the display driving circuit has a state register: and the state register may store the abnormal operating instruction and the normal operating instruction. For example, the digital signals of 9C are used to represent the normal operating instruction, and the digital signals (for example, 9D) other than the digital signals of 9C represent the abnormal operating instruction. When the current operating state of the display panel is determined to be the abnormal operating state. 9D representing the abnormal operating instruction may be stored in the state register: and when the current operating state of the display panel is determined to be the normal operating state. 9C representing the normal operating instruction may be stored in the state register.

In some embodiments of the present disclosure, in the blanking time period, the state request instruction is received, and the current operating state of the display panel is sent based on the state request instruction. The step of sending the current operating state of the display panel may include: sending the stored abnormal operating instruction when the current operating state of the display panel is determined to be the abnormal operating state; and sending the stored normal operating instruction when the current operating state of the display panel is determined to be the normal operating state. Exemplarily, the digital signals of 9C represent the normal operating instruction, and the digital signals (for example, 9D) other than the digital signals of 9C represent the abnormal operating instruction. When the current operating state of the display panel is determined to be the normal operating state, the display driving circuit may send the stored 9C to the main control unit; in this way, the main control unit may receive the normal operating instruction represented by 9C, such that it may be determined that the display panel is in the normal operating state, that is, protective measures and/or abnormal alarm on the display panel in operation are not required. When the current operating state of the display panel is determined to be the abnormal operating state, the display driving circuit may send the stored 9D to the main control unit; in this way, the main control unit may receive the abnormal operating instruction represented by 9D, such that it may be determined that what received is not 9C, and then it may be determined that the display panel is in the abnormal operating state. In this case, the display panel may be controlled to reset, restart or close, to protect the display panel and/or perform abnormal alarm. In particular, when a display apparatus is a wearable product (a smart watch a virtual reality device, or the like), better protection and/or abnormal alarm may be performed on products.

In some embodiments of the present disclosure, the blanking time period may be entered after the active level of the clock signal corresponding to the gate-on signal loaded by the last gate line in the display panel ends. Exemplarily as shown in FIG. 9, the blanking time period TB may be entered when a falling edge of the last high level (that is, the active level) of the clock signal ck12 appears.

In some embodiments of the present disclosure, after the blanking time period is entered and a set time passes, the state request instruction is received. Exemplarily as shown in FIG. 9 after the blanking time period is entered and the set time td passes, the state request instruction may be received. That is, after the blanking time period is entered and the set time td passes, the main control unit may send the state request instruction to the display driving circuit; and after receiving the state request instruction, the display driving circuit sends the current operating state of the display panel to the main control unit. Since when the blanking time period is just entered, the operation of the main control unit and a display driving chip may be unstable after a certain time td passes and the operation of the main control unit and the display driving chip tends to be stable, the main control unit sends the state request instruction to the display driving circuit. After receiving the state request instruction, the display driving circuit sends the determined current operating state of the display panel to the main control unit. Therefore, the state request instruction, and the abnormal operating instruction and the normal operating instruction corresponding to the current operating state of the display panel may be stably transmitted.

In some embodiments of the present disclosure, in each of a plurality of continuous display frames, in the data refresh period, the current operating state of the display panel may be determined: and in the blanking time period, the current operating state of the display panel is determined to be sent. In this way, the operating state of the display panel may be tested at each display frame, to improve the operating stability of the display panel.

In some embodiments of the present disclosure, in display frames of at least every other display frame in the plurality of continuous display frames, in the data refresh period, the current operating state of the display panel is determined: and in the blanking time period, the current operating state of the display panel is determined to be sent. In this way, the operating state of the display panel may be tested at part of the display frames, such that power consumption may be reduced. Exemplarily, in the display frames of every other display frame in the plurality of continuous display frames, in the data refresh period, the current operating state of the display panel is determined: and in the blanking time period, the current operating state of the display panel is determined to be sent. For example, in the odd-numbered display frame (for example, the first display frame, the third display frame, the fifth display frame and so on), in the data refresh period, the current operating state of the display panel is determined; and in the blanking time period, the current operating state of the display panel is determined to be sent. Alternatively, in the even-numbered display frame (for example, the second display frame, the fourth display frame, the sixth display frame and so on), in the data refresh period, the current operating state of the display panel is determined: and in the blanking time period, the current operating state of the display panel is determined to be sent. Definitely, three, four, five or more display frames may be spaced, in the data refresh period, the current operating state of the display panel is determined: and in the blanking time period, the current operating state of the display panel is determined to be sent.

Figure 10:
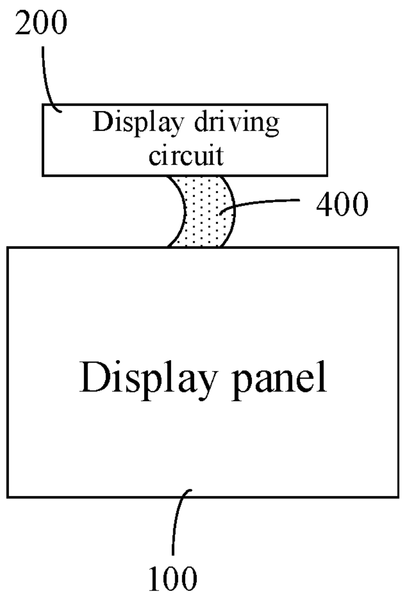
FIG. 10 is a schematic diagram of some other structures of a display apparatus according to embodiments of the present disclosure.

In the display apparatus, especially in a wearable product, in order to reduce costs, one display driving circuit may be disposed. Exemplarily as shown in FIG. 10, the display apparatus further includes a signal transmission board 400 (for example a flexible printed circuit board). The display driving circuit 200 is coupled to the display panel 100 through the signal transmission board 400. The signal transmission board 400 may have a plurality of signal transmission lines, and the signal transmission board may transmit the clock signal sent by the display driving circuit to the display panel. Exemplarily, the display driving circuit 200 may be a 0D0C chip. The 0D0C chip may be designed to display the display panel without any external auxiliary boost modules. That is, the 0D0C chip integrates all boost modules inside the chip, so that an integration level is relatively high. In addition, since the 0D0C chip integrates all boost modules inside the chip, the signal transmission board 400 may not need to be additionally provided with capacitors and resistors, such that the cost and design difficulty of the signal transmission board can be reduced.

In addition, for the 0D0C chip, it is equivalent to that one chip completes a display driving operation of the entire display panel, such that the burden of the 0D0C chip is relatively heavy: and the stability of the signal is relatively poor, such that the outputted signals are more susceptible to interference. For example, when the display driving circuit sends the clock signal with alternating high and low levels to the gate driving circuit, interference is caused to the clock signal, leading to a wider high level of the clock signal as shown in a dashed box in FIG. 7. In the driving method provided in the embodiments of the present disclosure, in the data refresh period, the current operating state of the display panel may be determined, and since the clock signal is a dead voltage in the blanking time period, sending the current operating state of the display panel in the blanking time period may avoid interference with the active level of the clock signal when the current operating state of the display panel is sent, the clock signal may not need to be additionally switched to the inactive level, and a signal sequence may not need to be additionally changed, so that the gate driving circuit can normally output in cascade, so as to prevent the display panel from abnormally displaying.

Those skilled in the art should understand that the embodiments of the present disclosure may be provided as a method a system, or a computer program product. Therefore, the present disclosure may adopt forms of complete hardware embodiments, complete software embodiments or embodiments integrating software and hardware. Moreover, the present disclosure may adopt the form of a computer program product implemented on one or more computer available storage media (including but being not limited to a disk memory a Compact Disc Read Only Memory (CD-ROM), an optical memory, and the like) containing computer available program codes.

The present disclosure is described with reference to flowcharts and/or block diagrams of the method, the device (system) and the computer program product according to the embodiments of the present disclosure. It should be understood that each flow and/or block in the flowchart and/or block diagram, and the combination of the flow and/or block in the flowchart and/or block diagram can be implemented by the computer program instructions. These computer program instructions can be provided to a processor of a general-purpose computer a special-purpose computer, an embedded processor or other programmable data processing devices to generate a machine, so that instructions which are executed by the processor of the computer or other programmable data processing devices generate a device which is used for implementing the specified functions in one or more flows of the flowchart and/or one or more blocks of the block diagram.

These computer program instructions may also be stored in the computer-readable memory which can guide the computer or other programmable data processing devices to work in a particular way, so that the instructions stored in the computer-readable memory generate a product including an instruction device. The instruction device implements the specified functions in one or more flows of the flowchart and/or one or more blocks of the block diagram.

These computer program instructions may also be loaded on the computer or other programmable data processing devices, so that a series of operation steps are performed on the computer or other programmable data processing devices to generate the processing implemented by the computer, and the instructions executed on the computer or other programmable data processing devices provide the steps for implementing the specified functions in one or more flows of the flowchart and/or one or more blocks of the block diagram.

Although the preferred embodiments of the present disclosure have been described, those skilled in the art may make additional changes and modifications to these embodiments once the underlying creative concepts are known. Therefore, the appended claims are intended to be construed to include the preferred embodiments and all changes and modifications that fall within the scope of the present disclosure.

It is apparent that those skilled in the art may make various modifications and variations to the embodiments of the present disclosure without departing from the spirit and scope of the present disclosure. Therefore, if such modifications and variations of the embodiments of the present disclosure fall within the scope of the appended claims and their equivalents, the present disclosure is also intended to cover the modifications and variations.

What is claimed is:

1. A driving method for a display panel, wherein a display frame comprises a data refresh period and a blanking time period; and the driving method for the display panel comprises:

in the data refresh period, loading a clock signal comprising an active level and an inactive level to a gate driving circuit in the display panel to cause a gate line to load a gate-on signal, loading display data to a source driving circuit in the display panel to cause a data line to load a data voltage, and determining a current operating state of the display panel; and in the blanking time period, loading a clock signal comprising an inactive level to the gate driving circuit in the display panel to cause the gate line to load a gate-off signal, and sending the current operating state of the display panel.

2. The driving method for the display panel according to claim 1, wherein the determining the current operating state of the display panel comprises:

collecting a protection signal outputted by a protection circuit disposed in the display panel;

determining the current operating state of the display panel to be an abnormal operating state in a case that the protection signal is not less than a signal threshold; and determining the current operating state of the display panel to be a normal operating state in a case that the protection signal is less than the signal threshold.

3. The driving method for the display panel according to claim 2, further comprising:

generating and storing an abnormal operating instruction while determining the current operating state of the display panel to be the abnormal operating state; and generating and storing a normal operating instruction while determining the current operating state of the display panel to be the normal operating state;

wherein the sending the current operating state of the display panel comprises:

sending the stored abnormal operating instruction in a case that the current operating state of the display panel is determined to be the abnormal operating state; and sending the stored normal operating instruction in a case that the current operating state of the display panel is determined to be the normal operating state.

4. The driving method for the display panel according to claim 1, further comprising:

in the data refresh period, receiving a static electricity detection instruction, and determining the current operating state of the display panel based on the static electricity detection instruction.

5. The driving method for the display panel according to claim 1, further comprising:

in the blanking time period, receiving a state request instruction, and sending the current operating state of the display panel based on the state request instruction.

6. The driving method for the display panel according to claim 1, wherein the blanking time period is entered after the active level of the clock signal corresponding to the gate-on signal loaded by a last gate line in the display panel ends.

7. The driving method for the display panel according to claim 6, wherein after the blanking time period is entered and a set time passes, a state request instruction is received.

8. The driving method for the display panel according to claim 1, further comprising:

in each of a plurality of continuous display frames, determining the current operating state of the display panel in the data refresh period, and determining the current operating state of the display panel to be sent in the blanking time period.

9. The driving method for the display panel according to claim 1, further comprising:

in display frames of at least every other display frame in a plurality of continuous display frames, determining the current operating state of the display panel in the data refresh period, and determining the current operating state of the display panel to be sent in the blanking time period.

10. A display apparatus, comprising:

a display panel, comprising a gate driving circuit and a source driving circuit; and a display driving circuit, configured to:

in a data refresh period, load a clock signal comprising an active level and an inactive level to the gate driving circuit in the display panel to cause a gate line to load a gate-on signal, load display data to the source driving circuit in the display panel to cause a data line to load a data voltage, and determine a current operating state of the display panel; and in a blanking time period, load a clock signal comprising an inactive level to the gate driving circuit in the display panel to cause the gate line to load a gate-off signal, and send the current operating state of the display panel;

wherein a display frame comprises the data refresh period and the blanking time period.

11. The display apparatus according to claim 10, further comprising a main control unit, wherein the main control unit is configured to send a state request instruction in the blanking time period; and the display driving circuit is further configured to, in the blanking time period, receive the state request instruction, and send the current operating state of the display panel to the main control unit based on the state request instruction.

12. The display apparatus according to claim 11, wherein the display driving circuit comprises a state register; and the state register is configured to store an abnormal operating instruction and a normal operating instruction.

13. The display apparatus according to claim 12, wherein the main control unit is further configured to send a static electricity detection instruction in the data refresh period; and the display driving circuit is further configured to, in the data refresh period, receive the static electricity detection instruction, and determine the current operating state of the display panel based on the static electricity detection instruction.

14. The display apparatus according to claim 10, further comprising a signal transmission board, wherein the signal transmission board comprises a plurality of signal transmission lines;

the display driving circuit is coupled to the display panel through the signal transmission board; and the signal transmission board is configured to transmit the clock signal sent by the display driving circuit to the display panel.

15. The display apparatus according to claim 14, wherein the signal transmission board comprises a flexible printed circuit board.

16. The display apparatus according to claim 10, wherein a quantity of the display driving circuit is one.

* * * * *